Figure 1:
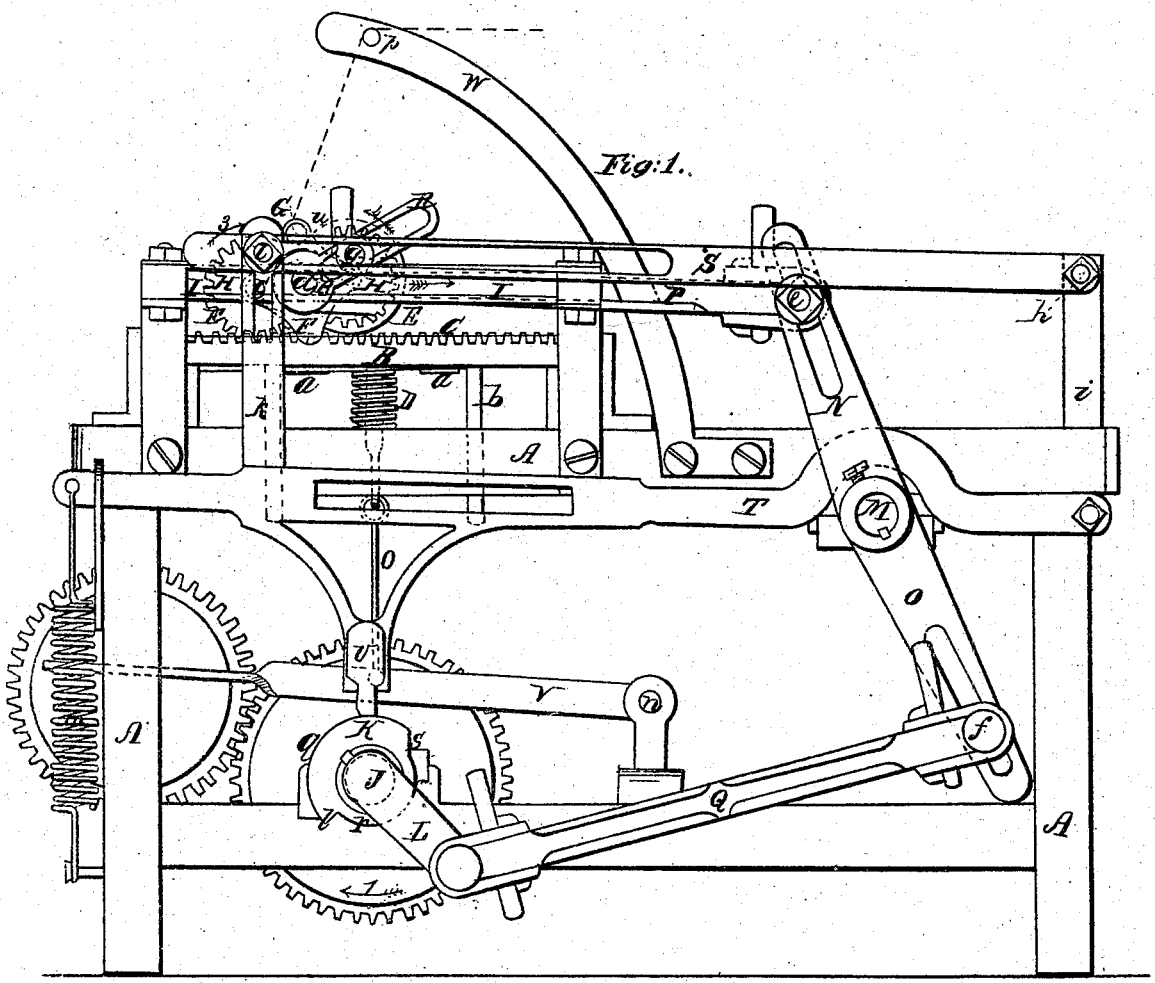

*Sheet 1 - 2 Sheets.*

H. Boot.
Folding and Measuring Cloth.

Nº 8,005. Patented Apr. 1, 1851.

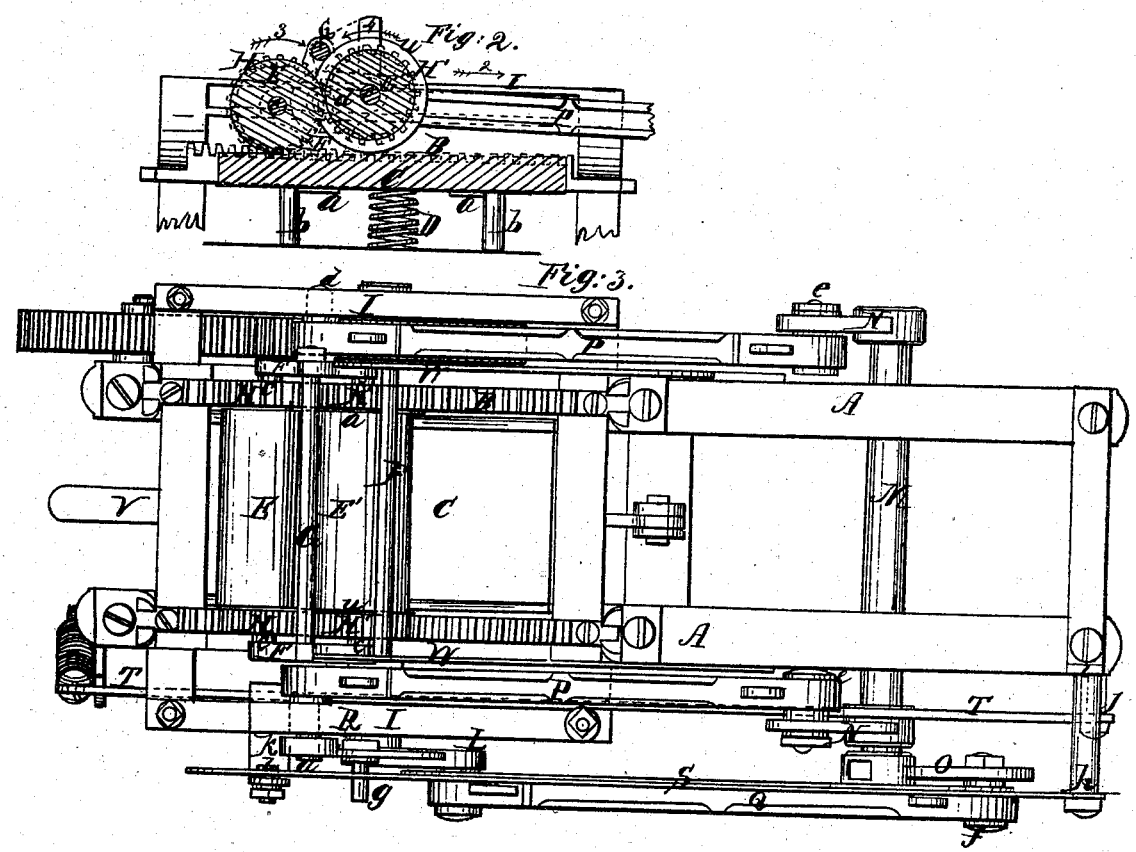

UNITED STATES PATENT OFFICE.

HENRY BOOT, OF NEW BEDFORD, MASSACHUSETTS.

MACHINE FOR FOLDING AND MEASURING CLOTH.

Specification of Letters Patent No. 8,005, dated April 1, 1851.

*To all whom it may concern:*

Be it known that I, HENRY BOOT, of New Bedford, in the county of Bristol and State of Massachusetts, have invented certain new and useful Improvements in Machinery for Folding and Measuring Cloth; and I do hereby declare that the following is a full, clear, and exact description of the same, reference being had to the accompanying drawings, forming a part of this specification, in which—

Figure 1, is a side elevation. Fig. 2, is a vertical section of some of the parts detached, and Fig. 3, is a plan.

Similar letters of reference in the several figures refer to corresponding parts.

The nature of my invention consists in folding and measuring cloth of any description during the process of calendering, or by passing it between a pair of rollers similar to calender rollers geared together by toothed wheels which receive rotary motion by being drawn back and forth along toothed racks, the wheels on each roller alternately being brought into gear with the racks as the change takes place in the direction in which the rollers move along the racks, and both the rollers receiving a continuous rotary motion; a table is placed under the rollers and the roller whose wheels are in gear with the racks always bears upon it; the cloth is drawn through the rollers by their revolution and laid in folds by their motion back and forth upon the table, the length of the folds being exactly the length of the motion of the rollers along the table, which motion is of a given length, as for instance one yard, and thus the number of times the rollers travel back and forth will give the number of yards or lengths passed through them.

To enable others skilled in the art to make and use my invention, I will proceed to describe its construction and operation.

A, A, is a frame of suitable form and dimensions to carry the working parts of the machinery; on the top of the frame there are two stationary parallel toothed racks B, B, one on each side; between the toothed racks is the table C, of wood supported by a spring D, and having small plates $a$, $a$, secured to its under side projecting under the racks for the purpose of preventing its being raised too high by the spring, it is kept in place by guide pins $b$, $b$, secured to its under side, and passing through guides in the frame, its upper side is covered with sand paper or other material for making its surface tenacious.

E, E′, are a pair of calender rollers which are sometimes of metal and sometimes of wood with an iron axle, their axles $c$, $c$, are parallel and have journals running in bearings in plates F, F, which are secured together by a bolt or bolts G, so as to form a strong frame or carriage; the bearings may be made adjustable so as to set the rollers at any distance apart according to the thickness of the cloth to be passed between them, but as that forms no part of the present invention the means of adjusting them are not shown. Each of the plates F, F, is provided with a stud or axle $d$, secured on its outside, both the studs being in line midway between the axles of the rollers. The roller E, carries a pair of toothed wheels H, H, one at each end within the plates F, F, and that E′, a similar pair of wheels H′, H′, the wheels on each roller, gear into each other and are capable of gearing into the racks B, B.

I, I, are stationary horizontal guide frames having slots in which the studs $d$, $d$, work. The stud $d$, on the side turned to view in Fig. 1, carries a lever or arm R, outside the guide I; this arm is provided with a pin or stud $g$, adjustable in a slot and capable of being secured at any distance from the center of the stud $d$. J, is the main shaft which rests in plumber blocks upon the lower part of the frame, it carries a crank L, and a cam K, both outside the frame, the cam K, is divided into two parts each being semicircular or nearly so, the part $q$, is of larger diameter than that $r$; an inclination $s$, and a fall or step $t$, unite the two parts $q$ and $r$ on opposite sides.

M, is a shaft resting in plumber blocks near the top of the frame it carries a pair of levers or arms N, N, one on each side of the frame and another lever or arm O, on the same side of the frame as the crank on the main shaft M. The levers N, N, are each provided with a stud or pin $e$, adjustable in a slot and capable of being secured at any distance from the center of the shaft; these studs are connected with the studs $d$, $d$, by connecting rods P, P, within the guides I, I.

The lever O, is provided with a stud or pin f, adjustable in a slot at any distance from the center of the shaft, the stud or pin f, is connected by a connecting rod Q, to the crank L, S, is a long lever or bar hung on a stud h, secured in a standard i, at the back end of the frame; this lever has a slot of about the same length as the slots in the guides I, I, and in it the stud g, on the arm R, works. T, is another lever hung on a fixed stud j, secured in the back end of the frame, it is connected by a bar k, to the lever S, above it, a stud l, secured in a slot in the said bar, fitting in the slot in the lever S; there is an arm V, on the under side of the lever T, whose end bears on the cam K, being held down to it by a spring m, or a weight.

v, is a lever hung on a fulcrum joint n, under the frame, it connects by a rod o, with the table C, and is for the purpose of drawing down the table by the pressure of the operation foot.

W, W, are a pair of standards secured one on each side at the top of the frame, p, is a bar or roller reaching across between the standards W, W, over this bar or roller the cloth is conducted to the rollers E, E.

The operation of the machinery is as follows. Rotary motion is given to the main shaft in the direction of the arrow 1, (see Fig. 1) the crank J, giving motion to the connecting rod Q, communicates a vibrating motion to the levers O, N, N, on the shaft M, and the connecting rods P, P, give a reciprocating motion to the roller carriage F, F, G. As the carriage moves from left to right in the direction of the arrow 2, Figs. 1 and 2, the most prominent or larger part q, of the cam K, is acting upon the lever T, and it is raised, raising also the lever S. This lever by means of the stud g, throws up the arm R, tilting the carriage F, F, G, and keeping the wheels H', H', on the roller E', out of gear with the racks B, B, and the wheels H, H, on the roller E, in gear with the said racks, as shown by the drawings, giving motion to the rollers in the direction pointed out by the arrows 3, 4; the cam K, is so arranged on the shaft J, that at the precise moment the carriage reaches the end of its stroke in the above described direction, the fall or step b, will pass the end of arm v, and the lever T, will be drawn down by the spring m, which always exerts its force upon it, the arm v, now resting on the part r, of the cam; as the lever T, descends the lever S, will also descend and acting upon the stud g, will pull down the lever R and tilt the carriage in the opposite direction, throwing the wheels H, H, out of gear and those H', H', into gear with the racks B, B, this as the carriage commences its stroke to the left or in the opposite direction to that already described continues to give motion to the rollers in the same direction, until the carriage has finished its stroke to the left when the step s, on the cam raises the levers T, and S, and tilts the carriage to the position first described and shown in the drawings. As the wheels H, H, and H' H', are geared together, and revolve in opposite directions, if they are brought alternately in gear with the racks as the direction of their reciprocating motion changes, their motion will be constant, each one always moving in the same direction, and so nearly continuous that their stoppage during the tilting of the carriage as its motion changes, is scarcely perceptible.

The cloth to be operated upon is conducted from a roller above the machine, or from a brushing or dressing machine, over the roller or bar p, and over the bolt or bar G to the rollers, by whose revolution it is drawn through or between them, being protected from catching in the wheels by a flange u, at each end of the roller E'. The rollers whose wheels are in gear with the rack always bears upon the table C which is caused by the spring D, to bear against the roller with sufficient force.

Suppose the carriage to be traveling in the direction shown in the drawings and before described, the cloth is being laid by the roller E, flat upon the table; when the carriage has finished its motion to the right the roller E, will be raised and that E', lowered to the table. As the motion to the left commences the cloth will be left a little slack by the roller E, and will be folded by that E', which will pass over it and lay it flat upon the last fold, leaving it slack at the commencement of the motion of the carriage to the right when it will be folded by E, a fold being laid by each roller alternately until the whole piece is calendered and folded. The cloth when finished may be easily removed from the table by lowering it as described by the lever V.

It is designed that the stroke of the roller carriage shall be exactly one yard therefore the number of strokes of the carriage, or the number of folds in the cloth will be equal to the number of yards passed through the rollers. An indicator of any convenient description may be attached to the machine for the purpose of registering the measurement. The exact stroke of the carriage can be controlled by moving the pins or studs e, e, or f, in the slots in the levers N, N, O, and is not necessarily a yard as for instance it may be half a yard or any other length as may be determined, I have described it as a yard as most convenient for measuring but it would be equally practicable to register any other measurement.

A great saving in time will be effected by calendering, folding, and measuring at one operation, and where calendering is not required the operation of folding and measuring may be performed by a similar pair of rollers set at any distance apart according to the thickness of the cloth to be operated on.

Having thus fully described my invention I will proceed to state what I claim as new and desire to secure by Letters Patent.

1. Folding the cloth as it passes through or between the calender rollers during the process of calendering, or by passing it through or between a pair of revolving rollers E, E', similar to calender rollers, the said calender or other rollers being hung in a carriage F, F, G, which receives a reciprocating motion above or across a table C, and a tilting motion at each end of its stroke so as to bring each roller alternately to bear on the table as it (the carriage) moves in different directions across it it, thereby laying the cloth under the rollers on the table in folds or layers, in the manner substantially as herein described.

2. Making the reciprocating motions of the calender rollers of a certain fixed length, such length determining the length of the fold and thereby measuring the cloth substantially in the manner herein described. At the same time I wish it to be understood that I do not claim the measurement of cloth by folding it in layers or folds of a certain length, unless such layers or folds are laid by calender or other similar rollers.

In testimony whereof I have hereunto signed my name before two subscribing witnesses this twentieth day of November 1850.

HENRY BOOT.

Witnesses:
CHARLES D. BURT,
JOHN BRYANT.